Nov. 22, 1960  V. S. MURRAY  2,961,480
FLOOR OUTLET BOX
Filed Oct. 21, 1957

INVENTOR
VICTOR S. MURRAY

BY *Alex. E. MacRae*
ATTORNEY

2,961,480
FLOOR OUTLET BOX

Victor S. Murray, 357 Courtleigh Blvd., Toronto, Ontario, Canada

Filed Oct. 21, 1957, Ser. No. 691,293

1 Claim. (Cl. 174—48)

This invention relates to floor outlet boxes for telephone connections and the like.

The standard business telephone terminal outlet box is adapted to be mounted on the side of an office desk or on an office wall or the like. It is almost invariably mounted in a vertical position and access thereto is frequently awkward with resultant servicing difficulties. The desirability of providing a floor outlet box has been well recognized, particularly for association with floor duct wiring systems but thus far no such acceptable outlet box has been provided.

It is an object of this invention to provide a floor outlet box which is of simple and inexpensive manufacture, which may be mounted on a floor in an easy and rapid manner, and which is conveniently available for inspection and servicing.

The invention contemplates the provision of a floor outlet box comprising a base having means for attachment to an outlet fitting, a terminal block holder removably mounted on said base and having a pair of hinged sections, each section being arranged to receive a terminal block, one of said sections being in seating engagement with said base and the other of said sections being swingable into overlying relation with the first section and into substantally planar relation therewith, and a cover adapted to enclose the base and holder.

Figure 1:
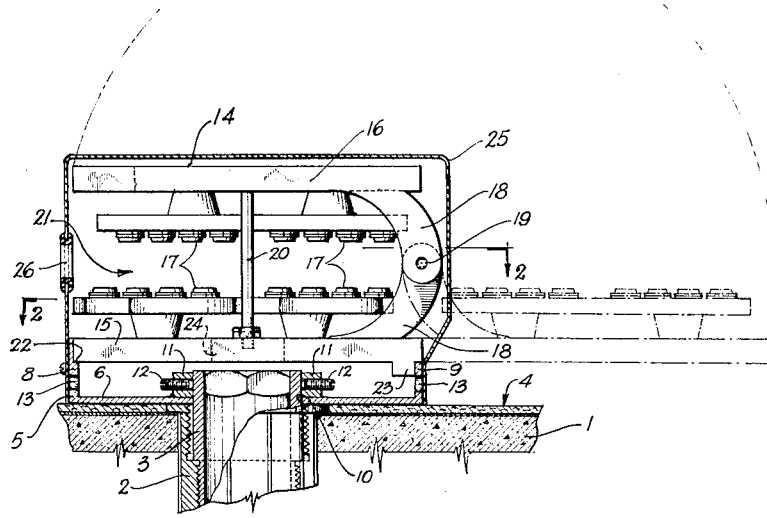
Figure 2:
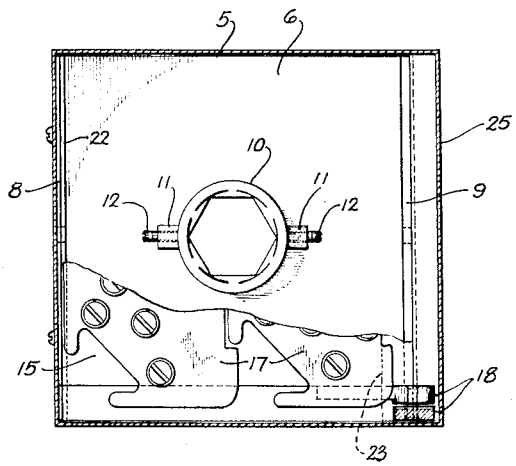

The invention will be described with reference to the accompanying drawing, in which:

Figure 1 is a sectional side elevation of an outlet box in accordance with the invention, and Figure 2 is a sectional plan view of the outlet box.

In the drawing, 1 indicates a cellular floor having ducts therein for passage of service wires, cables and the like. A tubular fitting 2 may be mounted in the floor to provide access to a service duct at any desired location. The fitting 2 has a nipple 3 which projects slightly above the floor surface 4.

The outlet box in accordance with the invention comprises a base 5 which, as shown, is a substantially square member having a bottom wall 6, and end flanges or walls 8 and 9. The base 5 also has a centrally disposed opening 10 in its bottom wall through which the projecting end of nipple 3 is adapted to extend. Opposed set screw housings 11 are mounted on bottom wall 6 adjoining the opening 10, and associated set screws 12 provide means for detachably securing the base to the nipple 3. It will be apparent that, in mounted position, the base 5 has its bottom wall 6 seated upon the floor surface 4, as clearly shown in Figure 1. Access to set screws 12 is provided by means of openings 13 in end walls 8 and 9.

A terminal block holder 14 comprises two plates 15 and 16 each having terminal blocks 17 mounted thereon. Plates 15 and 16 are hinged to each other by means of hinge members 18 which project from the terminal block supporting surfaces of the plates to a pivotal connection 19 to provide an offset hinge permitting plate 16 to overlie plate 15 in spaced parallel relation thereto, as clearly shown in Figure 1. A post 20 carried by plate 15 and having its upper end engageable by plate 16 supports plate 16 in the position mentioned. It will be observed that, in this position, a space 21 is provided between the two sets of terminal blocks carried by the plates to accommodate wire connections thereon.

Plate 15 is arranged for seating engagement with base 5 and, to this end, end wall 8 has a shoulder 22 for engagement by one edge portion of plate 15, the opposite edge portion of which engages the top edge of end wall 9. Plate 15 has a depending transverse rib 23 on its under side for engagement with the inner side surface of end wall 9 to locate the plate in proper seating relation with the base. Plate 15 has a central opening 24 for passage of cable.

A removable cover 25 fits over the holder 14 and base 5 to enclose the assembly. The cover 25 has a grommetted hole 26 for passage of cords or cables.

In use, with cover 25 removed and the plate 16 in open or dotted line position of Figure 1, the incoming telephone cable is passed through the fitting 2 and nipple 3 and through the opening 24 in the lower plate 15 of the terminal block holder. It will be apparent that the terminal blocks are all displayed in convenient horizontal position for easy access. The required number of wires are now attached to each terminal block, leaving sufficient slack to permit folding over of plate 16 into the fuel line position illustrated. The telephone cord which is outgoing to the telephone receiver is terminated in like manner on the terminal blocks again leaving enough slack to permit folding over of plate 16.

It will be apparent that the telephone cord is led through the hole 26 of cover 25 which is placed in the position shown to complete the assembly.

I claim:

A floor outlet box comprising a base having a flat floor engageable wall, outlet fitting attachment means mounted in and extending through said wall, and upright flanges at the ends of said walls, and a terminal block holder removably mounted on said base and having first and second sections each comprising a flat plate and terminal blocks mounted on one side only of said plate, said first section flat plate being seated upon said flanges in parallel relation to said wall and having said terminal block side thereof in outwardly facing relation with respect to said wall, said second section flat plate being hinged to said first section flat plate, said second section flat plate having a first position in overlying parallel relation with said first section flat plate and having its said terminal block side in spaced facing relation to said terminal block side of said first section flat plate in said first position, stop means defining said first position, said second section flat plate being swingable through an angle of approximately 180° to place it in substantially coplanar relation with said first section flat plate and thereby expose said terminal blocks on both said sections.

References Cited in the file of this patent
UNITED STATES PATENTS

| | | |
|---|---|---|
| 522,664 | Kleinsteuber | July 10, 1894 |
| 547,078 | Johnson | Oct. 1, 1895 |
| 733,568 | Sundh | July 14, 1903 |
| 1,223,167 | Hawthorne | Apr. 17, 1917 |
| 1,445,072 | Cook | Feb. 13, 1923 |
| 1,956,534 | Mample | Apr. 24, 1934 |
| 2,682,581 | Roggenstein | June 29, 1954 |
| 2,813,143 | Weston | Nov. 12, 1957 |

FOREIGN PATENTS

| | | |
|---|---|---|
| 742,289 | France | Dec. 27, 1932 |
| 912,709 | France | May 6, 1946 |